United States Patent [19]

Ravaux et al.

[11] Patent Number: 5,561,812
[45] Date of Patent: Oct. 1, 1996

[54] DATA TRANSMISSION SYSTEM FOR TRANSFERRING DATA BETWEEN A COMPUTER BUS AND A NETWORK USING A PLURALITY OF COMMAND FILES TO REDUCE INTERRUPTIONS BETWEEN MICROPROCESSORS

[75] Inventors: Paul Ravaux, Les clayes sous bois; Pascal Urien, Villepreux, both of France

[73] Assignee: Bull S.A., Pateaux, France

[21] Appl. No.: 589,765

[22] Filed: Jan. 22, 1996

Related U.S. Application Data

[63] Continuation of Ser. No. 121,295, Sep. 14, 1993, abandoned.

[30] Foreign Application Priority Data

Sep. 16, 1992 [FR] France ..................... 92 11054

[51] Int. Cl.$^6$ ..................................... G06F 13/00
[52] U.S. Cl. ................ 395/825; 395/200.2; 395/200.21; 395/821; 395/840; 364/242.95; 364/241.2; 364/DIG. 1
[58] Field of Search ................ 395/825, 821, 395/840, 200.2, 200.21, 310, 476, 200.02, 826, 250

[56] References Cited

U.S. PATENT DOCUMENTS

| | | | |
|---|---|---|---|
| 4,458,316 | 7/1984 | Fry et al. | 364/250 |
| 4,901,232 | 2/1990 | Harrington et al. | 364/826 |
| 5,237,659 | 8/1993 | Takats | 395/200.02 |
| 5,276,842 | 1/1994 | Sugita | 395/476 |
| 5,367,646 | 11/1994 | Pradillos et al. | 395/310 |

FOREIGN PATENT DOCUMENTS 0255090  2/1988  European Pat. Off. .

OTHER PUBLICATIONS

Bill Moren, "Link Multibus II and SCSI devices with smart adapter", Jun. 25, 1987, pp. 77–82.

"Protocol Implementation on the Nectar Communication Processor", Computer Communications Review, Cooper et al, vol. 20, No. 4, Sep. 1990, New York, pp. 135–144.

"The VMP Network Adapter Board (NAB): High–Performance Network Communication for Multiprocessors", Computer Communication Review, Hemant Kanakia, et al, vol. 18, No. 4, Aug./1988, New York, pp. 175–187.

*Primary Examiner*—Thomas C. Lee
*Assistant Examiner*—Le Hien Luu
*Attorney, Agent, or Firm*—Weingarten, Schurgin, Gagnebin & Hayes

[57] ABSTRACT

A data transmission system coupled between a computer bus (PBS) and a network (RE) includes a coupling device (GPU) linked to the bus and communicating by an interface with an adapter device (DEA) including a microprocessor (CPU2) connected to the network, an initial microprocessor (CPU1), and apparatus for transferring frames from the bus to the adapter device including a double port. The system is characterized by the fact that the interface is constituted by command files (F1 to F4) grouped in the memory, the second management processor handling software modules (ML1, . . . ML10) independent of each other, to manage the emission and reception of specific frames from the network and communicating by means of letter boxes (BAL1, etc . . . ) included in the second processor and/or command files.

7 Claims, 4 Drawing Sheets

DATA TRANSMISSION SYSTEM FOR TRANSFERRING DATA BETWEEN A COMPUTER BUS AND A NETWORK USING A PLURALITY OF COMMAND FILES TO REDUCE INTERRUPTIONS BETWEEN MICROPROCESSORS

This application is a continuation of application Ser. No.08/121,295, filed Sep. 14, 1993, now abandoned.

FIELD OF THE INVENTION

This invention concerns a system of data transmission between a computer bus and a network in the form of a ring with high transfer rate. It is particularly applicable to a data transmission network of the FDDI type for which fiber optics constitute the transmission medium, or even TPDDI type for which the transmission medium is constituted by a twisted pair.

BACKGROUND OF THE INVENTION

FDDI or TPDDI type data transmission networks are used more and more frequently and are broadly defined in documents prepared by international standardization boards like ANSI (American National Standard Institute), under reference X3T9-5. These standards are also adopted by the I.S.O., Organization Internationale de Normalisation (International Standard Organization). They define a set of physical and electrical characteristics of the network. These transmission networks have the advantage of having reached a high number of bits transmitted, on the order of 100 Mbits/s.

It is known that information messages emitted by the various stations are made up of a multiplicity of frames. The frame is constituted by usable data framed in time by command characters placed at the head and tail of the frame. In type FDDI or TPDDI networks, the length of the frames is 4 kilobytes and there are two main types of frames, defined by the standard, namely, frames of type LLC and frames of type SMT. Type LLC frames are actually made up of useful data to be transmitted and they are those most commonly used on the network. Frames of SMT type are special frames called "station management", or even station administration, for verification of proper operation of each one of the stations connected to the network. Furthermore, we know that all the operational components of a computer (processor, memory, controller, etc...) are arranged on a card assembly of standardized dimensions. These latter are linked to the same bus, generally of parallel type, guaranteeing communications among themselves and the various cards together with the carrying of data and the electric power supply.

One of the most commonly used buses is the MULTIBUSII (brand registered by the INTEL Company and commonly known as PSB or Parallel System Bus) standardized according to the IEEE1296 (Institute of Electrical and Electronic Engineers) norm.

Such a computer bus is linked to the network (FDDI or TPDDI) by the intermediary of a data transmission system (which may also be called a connection bridge device) whose function is to adapt conditions for transmission of data on the MULTIBUSII to transmission conditions on the network. In fact, the methods of data transmission concerning the rate of data transmission, transmission protocols used, entry codes, data, format, command characters, etc . . . , on the PSB bus on the one hand and the network on the other, are totally different.

Figure 1:
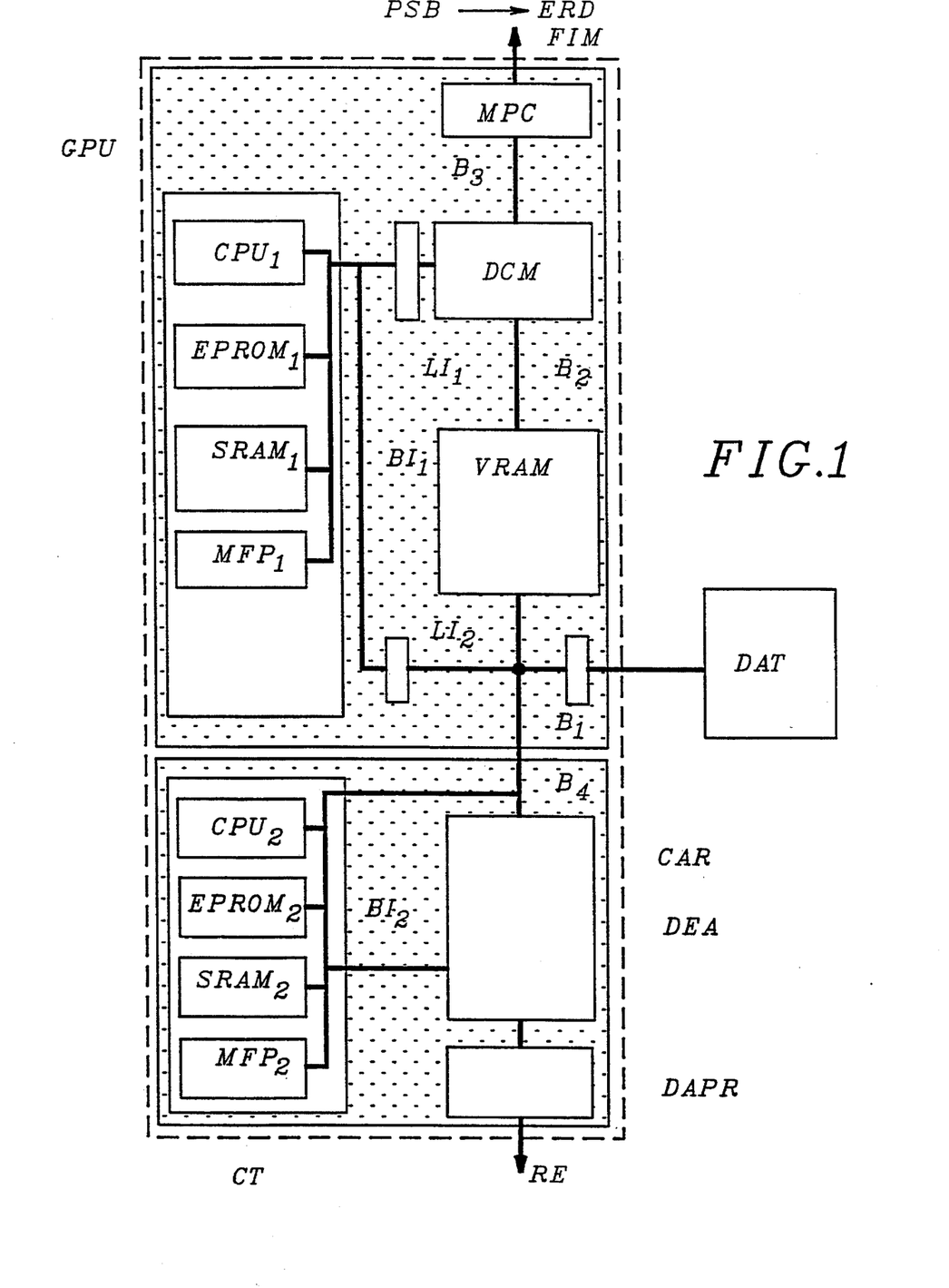
FIG. 1 shows what the various essential components are that make up a data transmission system as per the previous concept and as is described in one or the other of the two aforementioned patent applications.

The general physical structure of a data transmission system is shown in FIG. 1. It is described in more detail, together with the various methods of carrying out the operation, in either one of the applications for patent No. 91 08908 filed on Jul. 15, 1992 by BULL S.A. under the title "Universal device for connecting a computer bus to a controller of a group of peripherals" and No. 91 08907 filed on the same day by the same applicant under the title "Operating system for universal device for linking a computer bus to a specific network connection".

FIM, such a system of data transmission, is composed of two parts, that is, a universal coupling device GPU (English acronym for General Purpose Unit) and an adapter device DEA.

The device GPU is linked to PSB by an MPC coprocessor, type VL 82c389 manufactured by the INTEL Company, which communicates by message mode with the computer ORD (not shown in order to simplify FIG. 1), this mode being defined in the aforementioned IEEE 1296 standard.

The device DEA can be physically arranged on the same card as the universal coupling GPU. In addition, it is linked physically to the network RE in a manner such as that described in U.S. Pat. No. 5,237,659 entitled "Bridge device for connection of a computer bus to a fiber optic network in ring form", issued Aug. 17, 1993.

The GPU device is comprised of the following various essential components:

the MPC coprocessor already mentioned, the microprocessor $CPU_1$ actually constituting the central unit of the GPU, equipped with an internal bus $BI_1$ for carrying commands to the adapter device DEA. This microprocessor is associated respectively with a programmable erasable memory $EPROM_1$, a read/write memory $SRAM_1$ and an interruption manager, or $MFP_1$. All these elements $EPROM_1$, $SRAM_1$, $MFP_1$ are connected to internal bus $BI_1$, the double port video-RAM memory designated as VRAM, the direct access memory DMAC controller connected on the one hand to bus $B_2$, linking it to the VRAM memory, and on the other hand, to bus $B_3$, linking it to the coprocessor MPC, bus $B_1$ which links the VRAM memory to the adapter DEA, the components of which will be described subsequently.

The microprocessor $CPU_1$ is, in the production example described here, of type 68030 manufactured by the MOTOROLA Company. The internal bus $BI_1$ is a non-multiplexed bus of 32 bits for data and 32 bits for addresses.

The erasable read-only memory $EPROM^1$, for example, has a capacity of 256 kilobytes and contains the self-testing and initialization programs of the universal linking device GPU.

The operating system of the microprocessor $CPU_1$ (Operating System) designated by GPOS (English acronym for General Purpose Operating System) is contained in static memory $SRAM_1$ and is charged with initialization of the coupling device GPU. The capacity of this memory is, for example, 1 megabyte. GPOS is described in aforementioned claim No. 91 08907.

In FIG. 1 we can see that the direct access controller DMAC is serially connected on the one hand between the memory VRAM and the coprocessor MPC and on the other hand between this latter and bus BI of the microprocessor $CPU_1$.

A detailed description of the structure and operation of the controller DMAC is given in the application for French patent No. 91 15814 filed on Dec. 19, 1991 by the applicant company under the title "Controller of transfer of multiple data between a multiplicity of memory and a computer bus" from which a corresponding United States patent will issue from PCT application PCT/FR92/01202.

The microprocessor $CPU_1$ is the brain of the coupling device GPU: it initializes the transfer of data, carries out the adaptation of protocols, implements its operating system and transfers data between DEA and the computer ORD and vice versa while dialoguing with the DEA with which it exchanges commands and statuses as described farther on in the description of the invention.

The detailed description of the role and operation of other components of the coupling device is given in the three previously mentioned patent applications.

Examples of the invention of an adapter device like DEA are known. One such example is described in aforementioned U.S. Pat. No. 5,237,659, issued Aug. 17, 1993. Such a device comprises a transfer management controller CT, a network access controller DAR and a device for physical adaptation to the network DAPR.

The role of the transfer management controller CT is to organize the transfer of frames between the GPU apparatus and the adapter device and the network RE and vice versa while, at the same time, exchanging commands with the microprocessor $CPU^1$ of the GPU. The network access controller permits the physical transfer of data from the bus $B_1$ to the network RE via the physical adaptation device DAPR and the bus $B_4$ which is physically connected to $B_1$. The network access controller CAR and the device for physical access to the network DAPR are, for instance, constituted by components DP83265, DP83261, 83251 or 55, 83231, 83241 of Société National semi-conductors.

The controller CT is comprised of a microprocessor $CPU_2$, a memory $EPROM_2$, a storage memory SRAM, and an interruption manager $MFP_2$. All these components are linked by internal bus $BI_2$ of the transfer controller CT. It is quite evident that the microprocessor $CPU_2$ is the central element of the transfer controller CT and it is that that organizes the dialogue with the microprocessor $CPU_1$ through the intermediary of commands in a manner that will be described relative to the invention farther on in the text.

According to previous design, in the adapter device DEA, data and commands pass through the intermediary of two separate buses, with the commands passing through the intermediary of the internal bus $BI_2$ of the transfer controller CT. Otherwise, commands and data pass between the adapter device DEA and the coupling device GPU through the intermediary of a transfer interface composed of memories FIFO, one for data and one for commands (not shown in FIG. 1).

The presence of such an interface between the coupling device GPU and the adapter device DEA, diminishes the performances of the data transmission system with regard to speed of transfer of information of the DEA component to the GPU component and vice versa. Moreover, due to the presence of the FIFO elements, interruptions are generated (by configuration) at each exchange of commands between the two microprocessors $CPU_1$ and $CPU^2$.

SUMMARY OF THE INVENTION

This invention remedies these inconveniences by eliminating this FIFO type transfer interface and replacing it with command files arranged in the VRAM memory. Furthermore, in the $SRAM_2$ memory of the DEA adapter device there are software modules independent of each other that can, on the one hand, communicate among themselves and, on the other hand, with the management system of the microprocessor $CPU_1$ through the intermediary of letter boxes arranged in the $SRAM_2$ memory and/or command files arranged in the VRAM memory.

According to the invention, the data transmission system between a computer bus and a network in high transfer rate ring form includes a universal coupling device linked to the bus and communicating through an interface with an adapter device connected to the network through the intermediary of a network access controller. The universal device includes: a first microprocessor associated with a first memory and executing an operation system contained in the latter, and means of transferring frames from the bus to the adapter device and vice versa, including a double port memory arranged between the bus and the adapter device. The adapter device includes: a second microprocessor for management of the transfer of frames between the means of transfer and the access controller and vice versa.

The system is characterized by the fact that the interface is made up of a multiplicity of command files each of which is comprised of a bundle of commands of which at least a portion concern the emission or reception of frames, these files being arranged in the interior of the double port memory, and the second management processor comprising a multiplicity of software modules independent one from the other for managing the emission and reception of frames specific to the network, the software modules communicating among themselves and with the operating system of the first microprocessor by means of letter boxes included in the second processor and/or command files contained in the double port memory.

BRIEF DESCRIPTION OF THE DRAWING

Other characteristics and advantages of this invention will appear in the following description given as a non-restrictive example and referring to the appended diagrams in which.

DESCRIPTION OF THE PREFERRED EMBODIMENTS

Referring now to FIGS. 1, 2, 3a and 3b in which like elements are provided having like reference designating throughout the several views, the physical structure of the data transmission system according to the invention is as shown in FIG. 1. In contrast to the data transmission system (called bridge connection device) described in the aforementioned U.S. Pat. No. 5,237,659, issued Aug. 17, 1993, the interface between the universal coupling device GPU and the adapter device DEA is no longer composed of FIFO memories arranged between GPU and DEA, but is made up of a multiplicity of command files like $F_1$ to $F_4$ arranged inside the VRAM memory of the GPU device. These command files may be seen in FIG. 3a in the upper right portion of the VRAM memory. Moreover, the DEA adapter device comprises a multiplicity of software modules $ML_1$, $ML_2$, . . . , $ML_i$, . . . . , $ML_9$, $ML_{10}$, independent of each other and communicating among themselves through the intermediary of letter boxes $BAL_1$, $BAL_2$, $BAL_n$ arranged in static memory $SRAM_2$ of the management controller CT (see FIGS. 2 and 3b).

Figure 3A:
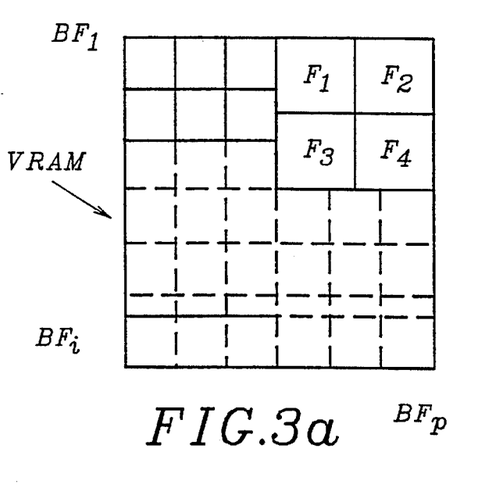
FIGS. 3a and 3b shows in one portion how the interface between the coupling device and the adapter device is constituted and, in the other, how the letter boxes inside the memory of the management processor of the adapter device are arranged.
Figure 3B:
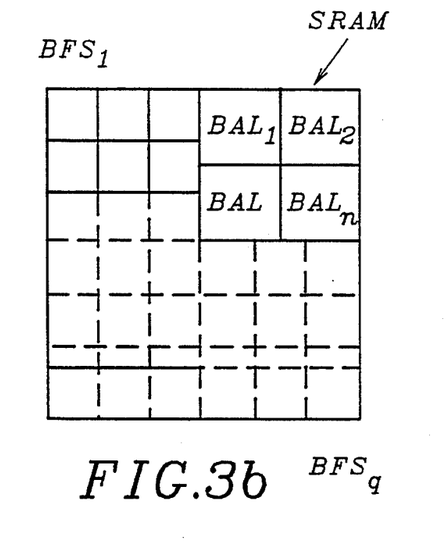

Each of the two memories VRAM and $SRAM_2$ may contain multiple memory zones designated by the Anglo-Saxon term buffer that are able to contain all or part of the frames of data that are transferred between the bus PSB and the network RE. Thus, the double port memory VRAM comprises a multiplicity of memory zones $BF_1$ to $BF_p$, while the static memory $SRAM_2$ is comprised of a multiplicity of memory zones $BFS_1$ to $BFS_q$. The length and address of origin of each one of these memory zones is, of course, variable over the course of time and depends on events that affect the data transmission system and, therefore, the nature and length of the frames that it is necessary to transfer from the bus PSB to the network RE and vice versa.

The adapter device DEA therefore allows connection to FDDI or TPDDI type network RE and reception from, or emission to, the network of LLC or SMT type frames, while autonomously assuring all responses or actions solicited by particular events or by SMT type frames. In other words, it may be said that the adapter device manages two types of behavior, the first concerning the emission or reception of LLC frames, the second concerning the emission or reception of SMT frames. In order to do this, the adapter device essentially needs to handle three types of commands which are defined in one or another of the command files $F_1$ to $F_4$ shown in FIG. 3a and contained in the VRAM memory. These commands are: (1) the order commands associated with the emission or reception of LLC frames; (2) SMT type commands that are received or emitted in the form of SMT type frames for carrying out tests of conformity either with the network or with any one of the stations in the network, including the one containing this adapter device; and (3) administrative commands that permit management of the configuration of the adapter device. As was stated above, the adapter device comprises a multiplicity of software modules, still called tasks, which communicate among themselves by means of letter boxes $BAL_l$ to $BAL_n$ and/or command files $F_1$ to $F_4$. A task is activated by a physical event which may be, for example, the reception of a command originating from the computer ORD via the bus PSB or even the reception of a frame, whether it be type LLC or SMT. A task may also be activated by another task.

All the commands have a structure identical to that of the two types of commands shown in Table 1. It is a matter, on the one hand, of commands issued by the computer ORD, called HOST commands, or even of internal commands engendered by any software module of the adapter device DEA.

TABLE 1

| bbbbbbbb 33222222 10987654 | bbbbbbbb 22211111 32109876 | bbbbbbbb 111111 54321098 | bbbbbbbb 76543210 | | bbbbbbbb 33222222 10987654 | bbbbbbbb 22211111 32109876 | bbbbbbbb 111111 54321098 | bbbbbbbb 76543210 |
|---|---|---|---|---|---|---|---|---|
| <CODE>TP | ..RFU... | 111111 | 00000000 | MOT 1 | <CODE>TP | ..RFU... | <Source> | <CHANNEL-> IZATION |
| <............IDENTIFIER............> | | | | MOT 2 | <IDENTIFIER> | | B<...NUMBERED..> BUFFER | |
| <......STATUS/OPTION.. | ..LENGTH......> | | | MOT 3 | ..STATUS/OPTION.. | | <......LENGTH......> | |
| <......ADDRESS......> | | | | MOT 4 | <......ADDRESS......> | | | |

HOST COMMAND      INTERNAL COMMAND

A command is made up of a four word cell of 32 bits each (or 16 eight-bit bytes in all). A buffer ($BF_1$ to $BF_p$ or $BFS_1$ to $BFS_q$) may or may not be associated with a command. The four words are designated by $MOT_1$ to $MOT_4$.

In Table 1 each bit is designated by the symbol b and the rank of the bit is indicated. This rank is read vertically from top to bottom. Thus, the bit of rank 31 is the bit placed the farthest to the left and the bit of rank 0, the bit placed on the right.

The word $MOT_1$ considered:

Bits b26 to b31 indicate the code applicable to the command.

The following types of operation correspond to the following values from b24–b25 respectively:

00: illicit operation
01: request
10: response
11: announcement

Bits b8 to b15 define the issuer of the command which may be either the GPU operation system or one or another of the DEA software modules. Whichever it is, GPU or one or another of the software modules, it is defined by a particular value from among all of these bits b8 to b15.

Bits b0 to b7 define the software channel associated with the command, bits b0 to b5 being equal to logical zero and the bit couple b7–b6 having the following values:

00 indicates that it is a logical channel specific to the GPU,
01 indicates that it is an internal logical channel,
10 indicates that it is for the use of the network
11 indicates that it is the serial standardized RS232 link connected to the adapter device DEA, utilized for maintenance purposes (for simplification, not shown in FIG. 1).

Concerning the word $MOT_2$:

If it concerns a HOST command (the logical channel is then that of the GPU), bits b0 to B31 define the identifier of the command. The identifier of a response to this command is equal to the identifier of the corresponding request.

If it is an internal command (in this case, the logical channel is different from the GPU), bits b16 to b31 define the identifier of the command and bits b0 to b14 the number of the buffer associated with this command, if there is one. Bit b15, if it is equal to zero, defines an associated buffer located in $SRAM_1$, that is, one of buffers $BFS_1$ to $BFS_q$. If it is equal to 1, it is an associated buffer located in VRAM, or one of buffers $BF_1$ to $BF_p$.

Concerning the word $MOT_3$:

Bits b16 to b31 identify the various options possible for a request or the status of a response. In fact, a request may be made in various ways. Thus, for example, for a disconnect request, there are several possible options for accomplishing this disconnection.

Bits b0 to b15 indicate the length (in eight-bit bytes) of the buffer associated with the command. If this length is null, the command is not associated with a buffer.

Concerning the word $MOT_4$:

Bits b0 to b31 identify the address of the buffer possibly associated with the command.

Two command channels permit emission and reception of commands. Each channel is composed of two files. These channels are as follows (see Table 1A):

TABLE 1A

- the order channel permits the emission and reception of LLC frames. It is associated with two files, that is, file $F_1$ for emission of frames and file $F_2$ for reception of frames.
- the administrative channel permits sending administrative commands to DEA. It is associated with two files, $F_3$ and $F_4$.

A file like $F_1$ to $F_4$ is a list of commands (remember that a command is coded on 16 eight-bit bytes). The number of elements of 11 a file is a power of 2: there are, therefore, $2^n$ commands per file.

A writing pointer PTFW and a reading pointer PTFR are associated with each file.

The reading or writing operations of a command are carried out in the following manner.

An interruption is associated with each one of the files $F_1$ to $F_4$. An interruption is generated only when the file passes from empty status to non-empty status (clearly, empty status corresponds to the absence of a written command in the file).

In order to better understand how these operations of reading or writing are carried out, turn to Table 2.

TABLE 2

| | EMPTY | | | COMMAND 4 | | | EMPTY | | | COMMAND 2 | |
|---|---|---|---|---|---|---|---|---|---|---|---|
| | EMPTY | | | COMMAND 5 | | | EMPTY | PTFW → | | EMPTY | |
| PTFW → | EMPTY | ← PTFR | | COMMAND 6 | | | COMMAND 0 | ← PTFR | | EMPTY | |
| | EMPTY | PTFW → | | EMPTY | PTFW → | | EMPTY | | | EMPTY | |
| | EMPTY | | | COMMAND 0 | ← PTFR | | EMPTY | | | EMPTY | |
| | EMPTY | | | COMMAND 1 | | | EMPTY | | | EMPTY | |
| | EMPTY | | | COMMAND 2 | | | EMPTY | | | COMMAND 0 | ← PTFR |
| | EMPTY | | | COMMAND 3 | | | EMPTY | | | COMMAND 1 | |
| | EMPTY File | | | FULL File | | | ENTRY OF A COMMAND, WITH INDICATION BY INTERRUPTION | | | ENTRY OF A COMMAND, WITHOUT INDICATION BY INTERRUPTION | |

Concerning writing, if one has:
PTFR=(PTFW+1) (module $2^n$), the file is full
If the file is not full, the following operations are carried out:
  a) the command is entered in the PTFW index,
  b) the logical PTFW=(PTFW+1) (module $2^n$) operation is carried out.
  c) if PTFW=PTFR+1, entry of this command must be indicated by an interruption as is the case when one passes from an empty file to a non-empty file.

Concerning the reading of a command:
If PTFR=PTFW, the file is empty.
If the opposite is true, the following operations are carried out:
  a) the command is read in the PTFR index.
  b) the logical operation PTFR=(PTFR+1) (module $2^n$) is carried out.

In order to be able to make use of a buffer, whether in VRAM memory or $SRAM_2$ memory, a buffer index list is essential. This list consists of $2^n$ words of 16 bits. Each word represents the index of an available buffer. There are two lists of buffers called $BUFL_1$ and $BUF_2$ which are arranged in the $SRAM_2$ memory. The first of these lists concerns the buffers contained in VRAM memory, that is, buffers $BF_1$ to $BF_p$, while the second list concerns the buffers contained in the $SRAM_2$ memory, or buffers $BFS_1$ to $BFS_q$. Associated respectively with each list of buffers there is a writing pointer PFWL, a reading pointer PFRL and a counter of used buffers, NBUF, indicating the total number of buffers utilized from the list. One accesses a buffer in the following way: If the buffer counter has a content equal to the size of the list, the latter is full and that means there is no buffer available. If the opposite is true, the index of the available buffer is read to the address defined by the pointer PFWL which indicates the first free buffer. And the following logical operation is then carried out:

PFWL=(PFWL+1) (module $2^n$).

To exit a buffer, the index of that buffer which therefore becomes available is written to the PFRL address and the following logical operation is then carried out:

PFRL=(PFRL+1 ) (module $2^n$).

The letter boxes $BAL_i$ to $BAL_n$ are each constituted by a list of $2^n$ commands, each command capable of being associated or not with a buffer. The buffers indicated above in VRAM or $SRAM_2$ are all available for each one of the letter boxes. The operation of a letter box is, therefore, exactly identical to the functioning of a command file.

As was said above, all the commands indicate the buffer length necessary for the reception or emission of a frame. Given that organization of the VRAM memory is carried out on a page of a maximum of 4 kilobytes each, and that a frame according to standard FDDI may have a length of up to 4500 kilobytes, it may be necessary to use two pages in VRAM memory to store a complete frame. In this latter case, the adapter then edits two commands, the first containing the length of the first portion of frame and the second indicating the length of the second portion of the frame.

The data transmission system according to the invention contains four interruption channels, GPU managing two interruption channels called IRQ-Tx and IRQ-REQ which indicate respectively the passages of command files $F_1$ and $F_4$ from empty to non-empty status and the adapter device DEA managing two interruption channels IRQ-Rx and IRQ-IND signaling respectively the passage of files $F_2$ and $F_3$ from empty to non-empty status.

There is no acknowledgement on a frame emission. This acknowledgement is implicit: in fact, if a command corresponding to this emission was read, it is accepted that it was executed. At the time of emission, GPU gives addresses and buffer lengths in corresponding commands. If the command file pointer advances, that signifies that the relevant frame has been emitted and that the corresponding associated buffer is then free. Consequently, it is seen that a command file serves to both:

manage the command,
  define and manage the memory locations where the frames or portions of frames should be stored.

In reception, the same broad lines as those defined above are applied. There is a single interruption in each file of commands and the latter manages both the commands and the associated buffers. This method of operation increases the speed of execution of the data transmission system.

Figure 2:
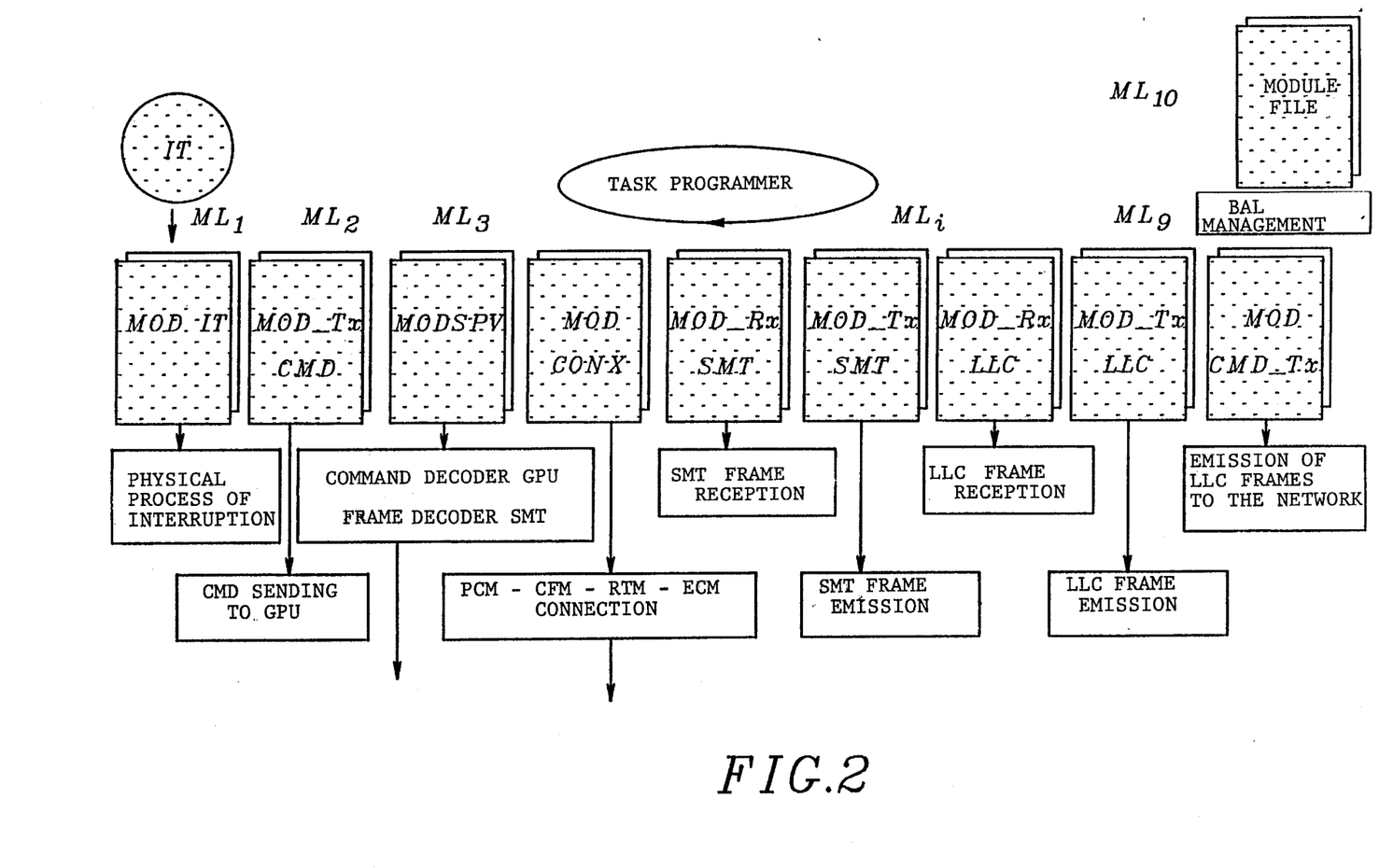
FIG. 2 shows the various software modules constituting the software operation of the adapter device belonging to the data transmission system according to the invention.

The various software modules contained in the $SRAM_2$ memory of the adapter device DEA are as follows:

1. Module $ML_1$, still called MODIT, handles physical interruptions IT, other than those relative to the emission and reception of frames, or those relating to the various command files. Particularly mentioned may be the handling of interruptions issuing from elements constituting the controller for access to the CAR network, or even interruptions originating from the RS232 link. According to what the interruption is that is analyzed by this module $ML_1$, the latter indicates the event to one or another of the software modules that may be concerned by said interruption, this event being indicated through the intermediary of the letter box associated with the module in question. The module is therefore activated when its letter box passes from the empty state to the non-empty state and it is deactivated when its letter box is empty.

2. Software module $M_2$, still called MOD-TX-CMD issues commands to the coupling device GPU or to the link RS 232. It manages the pointer PTFW of the $F_3$ command file. It is activated when its letter box passes from the empty state to the non-empty state and is deactivated when the latter is empty.

3. Module $ML_3$, still called MODSPV, is said to be a supervisory module which handles administrative and SMT commands. This module is activated when the $F_4$ file passes from the empty state to the non-empty state and when its letter box is simultaneously non-empty. It is deactivated when $F_4$ and its letter box are simultaneously empty.

The module therefore manages the PTFR pointers of the $F_4$ file. It is also responsible for the analysis and execution of commands from the GPU other than those relative to the emission or reception of type LLC frames. This module also analyzes the SMT frames received and is responsible for the generation of responses should that prove necessary.

4. Module $ML_4$, still called MODCONX, implements a certain number of automata defined in the SMT standard. These automata are the ECM automata (Entity Coordination Management), PCM (Physical Connexion Management), CFM (Configuration Management) and RMT (Ring Management) of this SMT standard.

The ECM automation receives requests for connection and disconnection on the FDDI type network RE, request issued from module $ML_3$, PCM carries out the physical connections or disconnections, CFM carries out the electrical connections between the PHY(s) and MAC elements of the network access controller CAR (defined in the FDDI standard and in the documents of the CAR manufacturer, see above), RMT enters the MAC of the station into the ring. It indicates changes of the ring status in module $ML_2$ (network connected or network disconnected).

module $ML_4$ is activated by the passage of its letter box from empty status to non-empty status, or by interruptions issued from PLAYER or BMAC elements of the network access controller CAR (also defined in the manufacturer's documents and in the FDDI standard). The module is deactivated when its letter box is empty and when the preceding automata have attained a stable status.

5. Module $ML_5$, still called MOD-RX-SMT, handles the reception of SMT frames. It is activated when the corresponding reception buffer (the one where the SMT frame concerned is received) passes from the empty state to the non-empty state and it is deactivated when this same reception buffer is empty. When an SMT frame must be handled, a command is entered into the letter box associated with module $ML_3$. This type of operation will be illustrated in more detail later on in connection with FIG. 4.

6. Module $ML_6$, still called MOD-TX-SMT, manages the emission of SMT frames. It is activated when the letter box associated with it is non-empty or even at the end of emission of an SMT frame. It is deactivated when the letter box corresponding to it is empty.

7. Module $ML_7$, still called MOD-RX-LLC handles reception of LLC frames. It is activated when the reception buffer allocated to the frame concerned passes from the empty state to the non-empty state and is deactivated when this same buffer is empty. This module manages the PTFW pointer of the $F_2$ command file. At each call corresponding to a frame reception, this module examines the situation of the PTFR pointer of file $F_2$ in order to possibly reutilize newly available reception buffers.

8. Module $ML_8$, still called MOD-TX-LLC is activated by an interruption indicating the end of emission of an LLC frame or of a whole chain of LLC frames. It notifies the computer ORD, through the intermediary of the $F_1$ PTFR file pointer, of the availability of buffers which have been previously used. It also detects the entry of new messages into the $F_1$ file and, if necessary, activates module $ML_9$, described below.

9. Module $ML_9$, still called MOD-CMD-TX, handles emission requests originating from the computer ORD. It is activated at the time of the transition of the $F_1$ file from empty to non-empty status. It is deactivated when all the requests emanating from ORD have been handled. Moreover, this module carries out all the operations necessary for the emission of LLC frames. On this subject, refer to aforementioned patent application 91 08908 which describes these operations.

Figure 4:
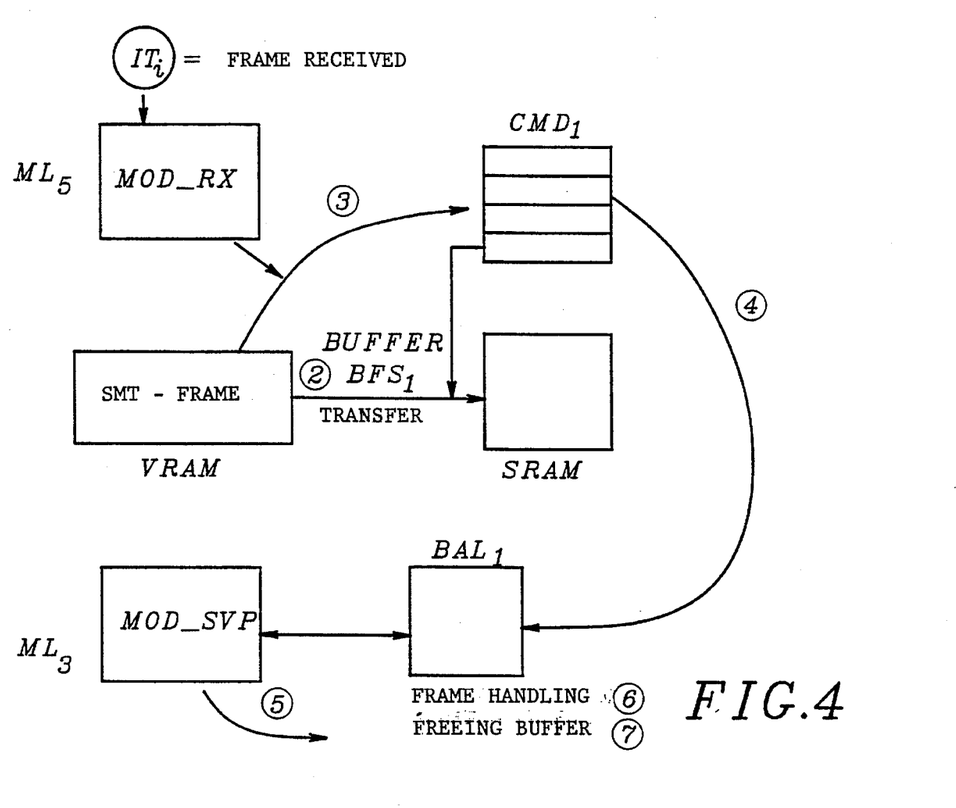
FIGS. 4 and 5 show two examples of operation for two specific types of frame of the FDDI network, of the adapter device putting into operation two software modules from among all those that comprise the operation software of this device.
Figure 5:
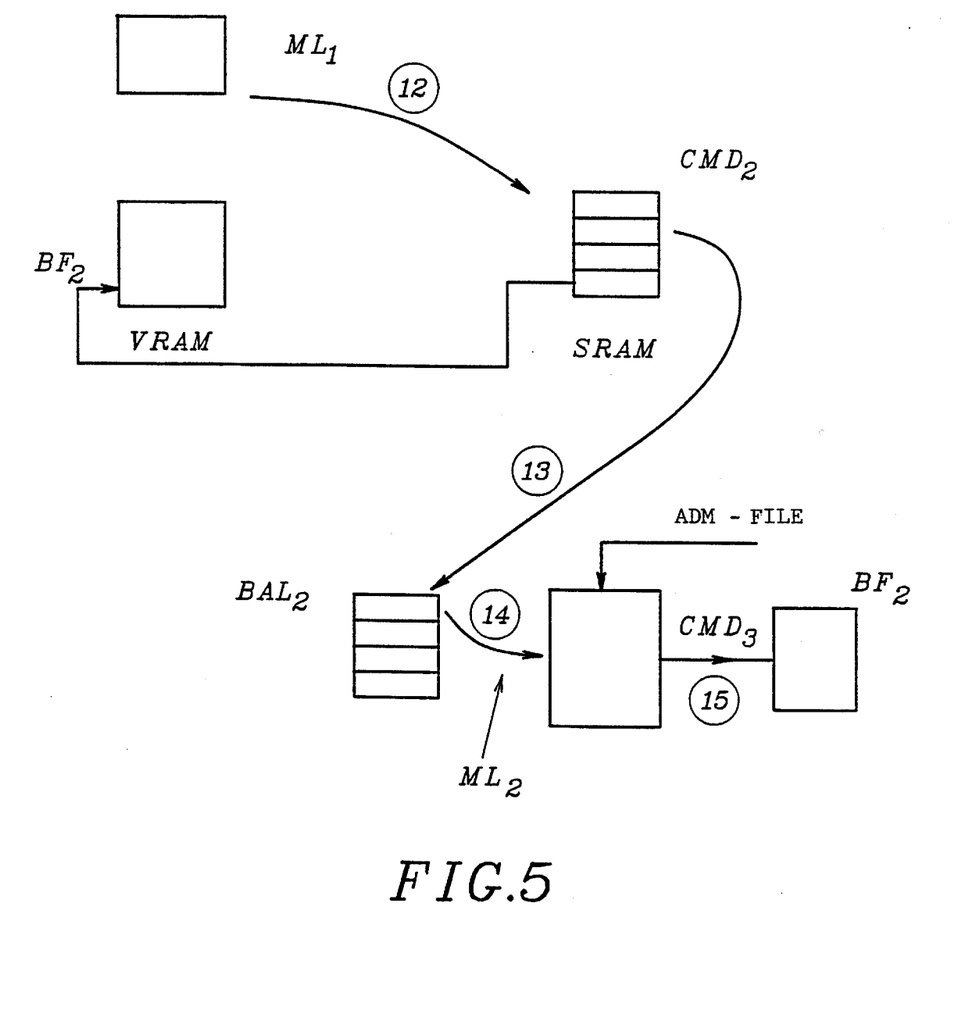

10. Module $ML_{10}$, still called MODFILE, is charged with the management of letter boxes $BAL_1$ to $BAL_n$. Reference is made henceforth to FIGS. 4 and 5 which show two examples of operations of modules frequently used and important, to wit, modules $ML_5$ and $ML_2$.

In looking at FIG. 4, one imagines that the adapter device DEA receives an SMT type frame originating from the network RE. This frame arrives directly into the VRAM memory and, for example, is stored in buffer $BF_1$. An interruption $IT_1$ alerts the $ML_5$ module, or MOD-RX-SMT, that a frame has arrived in the VRAM memory in buffer $BF_1$. It then passes to operation 2.

2. Module $ML_5$ transfers the SMT type frame from the $BF_1$ buffer into a free $BFS_i$ buffer in SRAM memory. In order to do this, the $ML_5$ module consults the list of buffers and chooses a free buffer.

3. During this operation the $ML_5$ module issues a command $CMD_1$ in which it indicates the location of the buffer $BFS_1$ and the length of the latter. It then passes to operation 4.

4. Module $ML_5$ transfers the contents of the command $CMD_1$ to letter box $BAL_1$ (should be that of the supervisory module MOD-SPV, module $ML_3$. Module $ML_3$ then carries out operation 5.

5. $ML_3$ is going to read the contents of its letter box $BAL_1$ and find that it has to handle an SMT frame which is found in buffer $BFS_1$, a frame with a specific length.

6. The supervisory module then handles the SMT type frame, as per the FDDI standard and once this has been done, passes on to operation 7.

7. $ML_3$ frees buffer $BFS_1$ following the routine indicated above.

From here on, we refer to FIG. 5 which describes how a command emitted by the adapter device DEA is sent to GPU. In this case, it is the $ML_2$ module (MOD-TX-CMD) that acts. We assume, therefore, that at the time of operation 11 the processor $CPU_2$ has issued a command $CMD_2$ through the intermediary of any module (except $ML_2$), $ML_1$, for example. This command is assumed to be an internal command. It is destined for file $F_3$. It passes on to operation 12.

12. At the time of this operation, module $ML_1$ consults the list of buffers and allots a free buffer in VRAM memory, for example, buffer $BF_2$ which will receive the contents of the command file before the latter is to be transferred to the command file. It moves on then to operation 13.

13. During this operation $ML_1$ transfers the command in letter box $BAL_2$ of $ML_2$. Once this is done, it proceeds to operation 14.

14. In this operation $ML_2$ transfers the contents of its letter box to file $F_3$. Once this has been done, the hand passes to the microprocessor $CPU_1$ of the GPU which comes to read the command in file $F_3$ and transfers it to buffer $BF_2$.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the appended claims.

What is claimed is:

1. A data transmission system coupled between a computer bus and a ring network, the data transmission system comprising:

a universal coupling device linked to the bus and communicating by an interface with an adapter device connected to the network through an intermediary of a network access controller wherein the universal device comprises:

an initial microprocessor associated with an initial memory and running an operation system contained in the latter;

means for transferring frames from the bus to the adapter device and vice versa, including a double port memory arranged between the bus and the adapter device, wherein the adapter device comprises:

a second microprocessor for management of frame transfer between the means for transferring frames and the network access controller and vice versa, wherein the interface is made up of a plurality of command files, each comprised of a bundle of commands at least a portion of which concern the emission or reception of frames, said command files managing locations of memory zones where frames or portions of frames are stored, these command files being grouped in the interior of the double port memory and with the second management processor handling a multiplicity of software modules, independent of each other, to manage the emission and reception of specific frames from the network, the modules communicating among themselves and with the operating system of the initial microprocessor by means of letter boxes included in the second processor and/or files of commands contained in the double port memory, an interrupt being generated only when command files change from an empty status to a non-empty status, whereby the total number of interrupts is reduced and performance is thereby improved.

2. The data transmission system of claim 1, wherein the network is of a FDDI type, and wherein the data transmission system includes a command file wherein the command file includes at least one of the following commands:

order commands associated with the emission or reception of type LLC frames;

SMT type commands which are received and emitted in a form of SMT frames for testing conformity either of the network or of any one of a plurality of stations of the latter; and administrative commands that permit configuration management of the adapter device.

3. The data transmission system of claim 2, wherein each command is provided as a four word cell of 32 bits, and wherein a memory zone capable of being associated or not with this command and capable of being found either in the double port memory or in the memory linked to the second microprocessor.

4. The data transmission system of claim 2, further comprising two command channels, enabling command emission or reception, each channel being made up of two command files, one for emission and the other for reception of commands, the first channel being an order channel, enabling the emission and reception of type LLC frames, while the second channel is an administrative channel permitting the sending of administrative commands to the adapter device.

5. The data transmission system of claim 4, wherein there are $2^n$ commands per file, each file being associated with a writing pointer and a reading pointer.

6. The data transmission system of claim 1, further comprising letter boxes, each letter box having a list of $2^n$ commands, each command being able to be associated or not to a memory zone, either in the double port memory, or in the memory belonging to the second microprocessor.

7. The data transmission system of claim 1, further comprising a plurality of interruption channels for signalling the passage of the command files from empty status to non-empty status.

* * * * *

UNITED STATES PATENT AND TRADEMARK OFFICE
CERTIFICATE OF CORRECTION

PATENT NO. : 5,561,812
DATED : October 1, 1996
INVENTOR(S) :
    Paul Ravaux, et al.

It is certified that error appears in the above-indentified patent and that said Letters Patent is hereby corrected as shown below:

Column 1, line 28, "Organization", should read --Organisation--.

Column 10, line 55, "elements of 11 a file", should read --elements of a file--.

Column 11, line 23, "full", should read, --full.--.

Column 11, line 43, "BUF$_2$", should read, --BUFL$_2$--.

Column 11, line 66, "BAL;", should read, --BAL$_1$--.

Signed and Sealed this

Sixteenth Day of June, 1998

Attest:

BRUCE LEHMAN

Attesting Officer     Commissioner of Patents and Trademarks